UNITED STATES PATENT OFFICE.

EMIL FISCHER, OF BERLIN, GERMANY, ASSIGNOR TO C. F. BOEHRINGER & SOEHNE, OF WALDHOF, GERMANY.

ALKYL DERIVATIVE OF URIC ACID AND PROCESS OF OBTAINING SAME.

SPECIFICATION forming part of Letters Patent No. 621,804, dated March 28, 1899.

Original application filed October 26, 1896, Serial No. 610,126. Divided and this application filed December 3, 1898. Serial No. 698,138. (No specimens.)

*To all whom it may concern:*

Be it known that I, EMIL FISCHER, a citizen of the Empire of Germany, residing at Berlin, in the Empire of Germany, have invented a certain new and useful Improvement in the Art of Obtaining the Alkyl-Derivatives of Uric Acids; and I do hereby declare the following to be a full, clear, and exact description of the invention, such as will enable others skilled in the art to which it appertains to make and use the same.

The present invention relates to the art of obtaining the substitution products of uric acids, and more particularly to the production of tetraalkyl-uric acid and trialkyl-uric acid.

In my Letters Patent No. 616,700, dated December 27, 1898, of which this is a divisional application, I have described a process which, broadly considered, consists in treating a uric acid with a haloid ether, such as iodid of methyl or ethyl or chlorid of benzyl, together with an alkali, preferably in the wet way. In that patent the present invention was described as one of the examples of carrying out that process. The present application is designed to cover this process specifically.

In my aforesaid patent I have described besides the process specifically forming the subject-matter of the present application processes of obtaining tetra-methyl-uric acids either by acting upon an alkylized uric acid with a haloid ether and an alkali or by acting upon uric acid proper with the same reagents and repeating such action. My present process is distinguished from these two last-mentioned specific processes in that by it the uric acid proper is directly converted into a tetra-alkyl-uric acid without necessitating a repetition of the action thereon with haloid ether and an alkali.

My present invention is, moreover, distinguished by the further advantage that under it there is a simultaneous formation of a considerable amount of $\alpha$-trimethyl-uric acid, a compound which hitherto could not be obtained directly from any uric acid, but which could only be prepared indirectly by first preparing chloropurin. (*Berichte der Deutschen Chemischen Gesellschaft*, Vol. 17, page 1782.)

As I have found by experiment and investigation when the amounts of alkali and haloid-ether under the process above set forth and covered generically in my aforesaid patent, No. 616,700, are at once added in sufficient quantities to correspond each to four molecules with relation to the amount of uric acid-proper the greater portion of the uric acid will be at once converted into tetramethyl-uric acid without necessitating the repeated action of the alkali and haloid-ether upon the uric acid. At the same time, as above pointed out, there is a considerable formation of $\alpha$-trimethyl-uric acid.

My invention therefore consists in adding to uric acid proper a sufficient amount both of an alkali and a haloid-ether, such as methyl-iodid, to make the ratio each of the latter reagents to the uric acid-proper correspond to that of four molecules of each of the latter reagents to one molecule of the uric acid.

My invention also consists in such further features, steps, and methods as will be set forth hereinafter and pointed out in the claims.

In illustration of my invention I will describe in detail what I consider the preferred method of carrying the same into practice.

Fifty grams of uric acid are dissolved in eight hundred grams of potash-lye of ten-per-cent. strength and eight hundred grams of water and heated with one hundred and eighty grams methyl-iodid to 100° centigrade and maintained at this temperature for two hours, while constantly shaking. The liquid is then acidified with acetic acid, then evaporated to dryness, and the residue is boiled or digested with chloroform. The tetra-methyl-uric acid is thus brought into solution, while the undissolved residue contains the $\alpha$-tri-methyl-uric acid in the form of a potassium-salt. The tetra-methyl-uric acid is precipitated from the solution by hydrochloric acid and purified in the known manner. The yield of tetramethyl-uric acid is about seventy per cent. with reference to the uric acid employed.

Instead of the caustic potash other alkalies may be used, and the term "alkali" as used in this specification and in the claims embraces not only the caustic alkalies—such as potassium-hydrate (KHO) or sodium-hydrate (NaHO) or potash-lye and soda-lye, &c.—but also the salts of the alkali-metals (including ammonium) with the weaker inorganic acids, such as carbonic, boric, phosphoric acids, or organic acids, such as acetic acid. These salts having preponderating alkaline properties will also answer when the difficultly-soluble uric acid is merely suspended and not completely dissolved in the liquid. Other haloid ethers may also be employed, and in case the haloid compounds of other alkyl-compounds than methyl are employed the corresponding tetra and trialkyl-uric acids will result.

From the above it will be seen that, broadly considered, my invention consists in the action upon uric acid-proper of a haloid-ether and an alkali in the proportion of at least four molecules of each of the latter to one molecule of the former.

What I claim, and desire to secure by Letters Patent of the United States, is—

1. In the art of preparing the alkyl-derivatives of uric acid the process which consists in acting on uric acid-proper with an alkali and a haloid-ether in the proportion of four molecules each of the alkali and the haloid-ether to one molecule of the uric acid, whereby tetra-alkyl-uric acid and trialkyl-uric acid will be directly obtained.

2. In the art of preparing the alkyl-derivatives of uric acid the process which consists in adding to uric acid-proper caustic potash-lye and methyl-iodid in the proportion of four molecules each of the caustic potash and of the methyl-iodid to one molecule of the uric acid.

3. The process which consists in dissolving uric acid proper in alkaline liquor in the proportion of one molecule of the uric acid to four molecules of the alkali and then heating the solution with a haloid-ether in the proportion of four molecules of the latter to one molecule of the uric acid.

4. The process which consists in dissolving uric acid in caustic potash-lye and water in the proportion of one molecule of uric acid to four molecules of the alkali and then adding methyl-iodid in the proportion of four molecules of the latter to one molecule of the uric acid and heating the mixture and agitating the same.

5. The process which consists in dissolving uric acid in caustic potash-lye and water in the proportion of one molecule of uric acid to four molecules of the alkali and then adding methyl-iodid in the proportion of four molecules of the latter to one molecule of the uric acid and heating the mixture and agitating the same, then acidifying and evaporating to dryness and digesting the residue with chloroform, whereby the tetramethyl-uric acid is brought into solution and thus separated from the $\alpha$-tri-methyl-uric acid.

In testimony whereof I affix my signature in presence of two witnesses.

EMIL FISCHER.

Witnesses:
 HENRY HASPER,
 ERWIN L. GOLDSCHMIDT.